R. C. NEWHOUSE.
MOTOR VEHICLE AND METHOD OF DRIVING SAME.
APPLICATION FILED JUNE 21, 1916.

1,374,947.

Patented Apr. 19, 1921.

Inventor
R. C. Newhouse
by
Attorney

UNITED STATES PATENT OFFICE.

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

MOTOR-VEHICLE AND METHOD OF DRIVING SAME.

1,374,947.          Specification of Letters Patent.     Patented Apr. 19, 1921.

Application filed June 21, 1916. Serial No. 105,306.

*To all whom it may concern:*

Be it known that I, RAY C. NEWHOUSE, a citizen of the United States, residing at Wauwatosa, in the county of Milwaukee and State of Wisconsin, have invented a certain new and useful Improvement in Motor-Vehicles and Methods of Driving Same, of which the following is a specification.

This invention relates to improvements in the construction and operation of motor vehicles, and especially to an improved method of and mechanism for driving vehicles in turning.

An object of the invention is to provide an improved method of manipulating motor vehicles. Another object is to provide a simple and efficient mechanism for carrying on this method. One of the more specific objects is to provide a process of driving normally differentially connected opposite wheels of a motor vehicle, by disconnecting one of the wheels while driving the other. Another specific object is to provide a mechanism which normally provides for automatic differential turning of the wheels on opposite sides of the vehicle, and which interchangeably provides for manual disengagement of the drive from the inner wheel, while making a turn. Still another object is to provide other details of motor vehicle construction and operation, which will permit most efficient manipulation of the vehicle.

In the operation of motor vehicles employing the ordinary form of differential mechanism, the front wheels tend to skid, due to the tendency of the vehicle to travel forward in a straight line and also due to the fact that wheels on opposite sides of the vehicle are acting as drivers. Such skidding occurs especially where the amount of friction between the vehicles and roadway is small. It has been found that skidding may be readily prevented even in making very short turns, by having a driving connection with an outer drive wheel and the inner drive wheel disconnected in turning the vehicle. It has also been found that driving of the inner wheel in turning is not as desirable as driving on the outer wheel, because of the relatively short distance traversed by the inner wheel and hence the necessity of applying greater force for the same work done than if driving is effected through the outer wheel. Driving on the inner wheel is also objectionable since such driving tends to turn the vehicle in a direction opposite to that desired, thereby subjecting the wheel bearings to undesirable pressures. These objections to driving on the inner wheels are eliminated by employing the present invention which contemplates driving on the outer wheels only whenever such driving is desirable, the invention being applicable to any type of vehicle or tractor.

In the prior art, the ordinary form of motor vehicle driving mechanism provides for differential turning of the wheels on opposite sides of the vehicle. The differential or differential mechanism, heretofore referred to, ordinarily employed comprises essentially two driven shafts carrying gears connected by pinions mounted in a housing driven by the motor. Theoretically this type of differential distributes the driving power equally between the wheels connected to the driven shafts on opposite sides of the vehicle, but in practice it is found that if the resistance to the rotation of either driver is less than sufficient to drive the load thereon, such driving wheel will spin at substantially double the ordinary speed and the wheel on the opposite side will fail to drive. These ordinary differentials have in some instances been provided with a locking device for positively preventing relative rotation of the driven shafts of the differential.

It has also been proposed to utilize in place of the ordinary form of differential, a positive one-way clutch inserted between the motor and each drive wheel, this device being disclosed in Patent 1,164,627, granted Dec. 21, 1915. By utilizing this device, the driving connection with the outer wheel is automatically released in turning the vehicle, and the driving connection with the inner wheel is retained.

As an improvement over this latter device, a device known as a gearless differential has been employed, the structure of which is disclosed in Patents 1,180,464 and 1,180,465, granted April 25, 1916. These so-called gearless differentials are also one-way clutches and when substituted for an ordinary differential, will also automatically unclutch the outer wheel in turning and will provide for driving through the inner wheel.

A special form of gear differential disclosed in Patent 1,090,082, granted March 10, 1914, has been utilized, in order to maintain an effective drive through one of the wheels in case the traction at the other wheel is destroyed.

The present invention as disclosed in the drawing, embodies the special form of differential disclosed in Patent 1,090,082, but it is to be understood that the invention is also applicable to mechanisms embodying in combination, any of the devices of the prior art above referred to, or any other devices having similar characteristics.

It has also been proposed to apply the present invention by specially adapting the so-called gearless differential above referred to, to perform the drive disconnecting function. In other words, the pawl members of the positive one-way clutches in the patented device have been adapted to be raised by mechanisms so as to disconnect the inner wheel from the ratchet wheel in turning. The driving is then effected by means of the outer wheel through the outer set of one-way positive clutches. No claim is herein made specifically to such described structure.

The ordinary form of differential may also be utilized to carry out the present invention by providing clutches between the driven shafts and the wheels and brakes for the driven shafts. In the operation of such modification of the invention, the inner clutch is released and the brake applied to the inner driven shaft and the outer clutch is maintained effective during turning, causing the outer effective drive wheel to run at double speed.

A clear conception of an embodiment of the invention may be had by referring to the drawing accompanying and forming a part of this specification, in which like reference characters designate the same or similar parts in the various views.

The expression "normal propulsion of the vehicle" as employed herein, includes propulsion in a straight forward direction as well as gradual turning, but does not include abrupt or short turning such as is effected by manipulation of the special mechanism forming the subject of the present invention.

Figure 2:
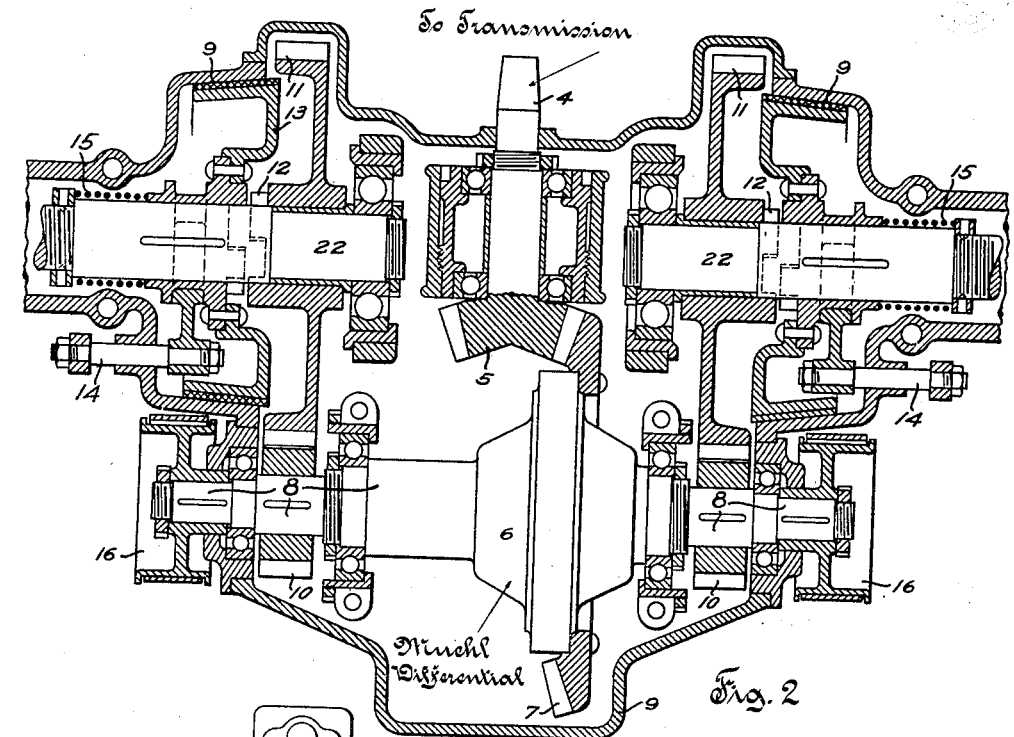
Fig. 2 is an enlarged transverse horizontal section of a fragment of the driving mechanism.

The motor vehicle drive comprises essentially a motor or engine 1, a main clutch 2, transmission mechanism 3, a main power shaft 4, a driving pinion 5, master gear 7, differential mechanism 6, driven shafts 8, 22, and traction elements or wheels 21. The engine 1, clutch 2 and transmission mechanism 3 are of ordinary form and require no detailed descriptions. The differential mechanism 6 is of the type disclosed in Patent 1,090,082, the master gear 7 being secured to a portion of the casing corresponding to the flange 5 of the device disclosed in the patent, and the driven shafts 8 corresponding to the driven shafts 10, 12 of the patented device. The shafts 4, 8, 22, are mounted in suitable bearings, preferably ball bearings, in the frame 9, see Fig. 2. The driven shafts 8 of the differential mechanism 6 are drivingly connected with the wheel carrying shafts 22 by means of pinions 10, gears 11, and clutches 12. The clutches 12 are adapted to establish and release the driving connections between the gears 11 and shafts 22. Brakes 13 associated with the shafts 22 are adapted to brake these shafts when the adjacent clutches 12 are released. The end of each driven shaft 8 is provided with a supplemental brake 16. The clutches 12 are normally urged into driving position and the brakes 16 simultaneously released by suitable springs 15. The springs 18 serve to limit the braking pressure applicable to the brakes 16, to a relatively small amount. The foot levers 20 acting through the rods 19 and levers 14, 17, serve to actuate the brakes 13, 16, and clutches 12 as will be later explained. The traction elements or wheels 21 are drivingly connected with the shafts 22 in any suitable manner.

Figure 1:
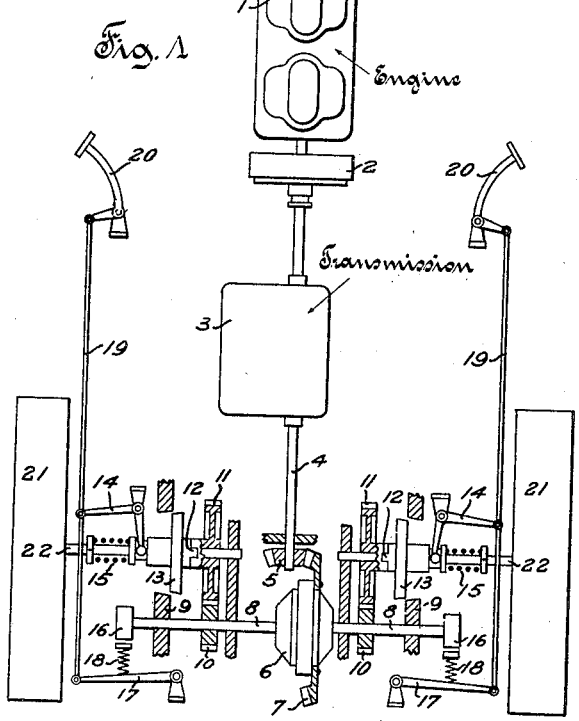
Figure 1 is a diagrammatic part sectional plan view of a motor vehicle drive.

During normal propulsion of the vehicle and while the same is not making a short turn, the driving mechanism is in the position disclosed in Fig. 1. The brakes 13, 16, are released and power is being transmitted through the differential mechanism 6, shafts 8, pinions 10, gears 11, clutches 12 and shafts 22, to the drive wheels 21. The differential mechanism 6 automatically takes care of slight deviations of the vehicle out of a straight path and also of variations in the speeds of the two wheels 21 in making a relatively long turn.

If however, it is desired to make a short turn, the foot lever 20 adjacent the center of curvature of the turn, is operated to throw out the corresponding clutch 12 and to subsequently set the corresponding brakes 13, 16, the spring 15 meanwhile being compressed. Setting of the brake 13 either slows down or stops the wheel 21, while setting of the brake 16 automatically simultaneously prevents relative rotation of the shafts 8, the degree of slowing down of the wheel 21 depending upon the degree of pressure applied to the lever 20, and this pressure depending upon the radius of curvature of the turn. The clutch 12 and brakes 13, 16, on the side of the vehicle remote from the center of curvature are not however disturbed, and the clutch 12 on this side continues to transmit power to its corresponding driving wheel 21. As the wheel 21 on the inside is slowed down or stopped, the driving outer wheel 21 forces the vehicle around the turn in response to the guiding effected by the front steering wheels. If it is desired to make a short turn in the opposite direction, the opposite foot lever 20 is manipulated and produces the desired result. When a lever 20 is released, the spring 15 corresponding thereto automatically returns the clutch 12 and brakes 13, 16 to the position disclosed in the figures.

With the use of the special form of differential mechanism 6 utilized herein, a relatively slight braking of one of the driven shafts 8 will permit normal driving through the other driven shaft. The degree of braking required to accomplish this result is determined by proper design and adjustment of the springs 18.

It will be noted that if the one wheel 21 is entirely stopped and the other wheel is driven, the vehicle will tend to turn about the fixed wheel as an axis. By driving the outer wheel 21, forward movement of the vehicle in a straight line, when turning is desired, is prevented, thereby avoiding skidding regardless of the friction between the steering wheels and the roadway.

It should be understood that it is not desired to be limited to the exact details of construction shown and described, for obvious modifications will occur to a person skilled in the art.

It is claimed and desired to secure by Letters Patent,—

1. In a vehicle, traction members on opposite sides of the vehicle, means for propelling at least one of said members including means whereby the opposite traction member may turn differentially during straight forward movement of the vehicle, and means for insuring, during turning, propulsion of only the outer traction member upon only disconnecting said traction members from each other.

2. In a vehicle, a pair of differentially connected drive elements, means for driving at least one of said elements, and means for maintaining a driving connection between one of said drive elements and an outer traction member upon only interrupting the driving connection between the other of said drive elements and an inner traction member.

3. In a vehicle, traction members mounted for differential movement during straight forward propulsion, and means for insuring, during turning, propulsion of only an outer traction member upon only disconnecting said traction members from each other.

4. In a vehicle, coaxial traction members mounted for differential movement during straight forward propulsion, and means for insuring, during turning, propulsion of only the outer of said traction members upon only disconnecting said traction members from each other.

5. In a motor vehicle, a motor, a pair of traction members on opposite sides of the vehicle, means for transmitting power from said motor to at least one of said traction members and for permitting the opposite traction member to turn differentially during straight forward propulsion of the vehicle, and means for maintaining driving engagement with the outer traction member, during turning, upon only disengaging the inner traction member.

6. In a motor vehicle, a driving motor, a differential associated with said motor, a pair of shafts associated with said differential, a pair of traction members, a clutch connection between each of said traction members and one of said shafts, and means for maintaining driving engagement with one of said traction members, during turning, upon only releasing one of said clutches.

7. In a motor vehicle, a driving motor, a differential associated with said motor, a pair of shafts associated with said differential, a brake for each of said shafts, a pair of traction members, and a clutch connection between each of said traction members and one of said shafts.

8. In a motor vehicle, a driving motor, a differential associated with said motor, a pair of shafts associated with said differential, a brake for each of said shafts, a pair of traction members, a clutch connection between each of said traction members and one of said shafts, and means for simultaneously operating one of said brakes and a clutch connection.

9. In a vehicle, traction members mounted for differential movement during straight forward propulsion and during turning of the vehicle, and means for insuring, during turning, propulsion of only the outer traction member upon only disconnecting said traction members from each other.

10. In a motor vehicle, a power transmission element, a pair of traction members, a differential connecting said traction members to said transmission element, and means for maintaining, during turning, propulsion of one of said traction members upon only disconnecting the other traction member from said transmission element.

11. In combination, a drive shaft, wheels, means for transmitting power differentially from said shaft to said wheels, means for disconnecting either wheel from said drive shaft, and means for substituting a drag on said power transmitting means at the drive shaft side of the point of disconnection.

In testimony whereof, the signature of the inventor is affixed hereto.

RAY C. NEWHOUSE.